United States Patent
Haraguchi et al.

(10) Patent No.: US 12,224,445 B2
(45) Date of Patent: Feb. 11, 2025

(54) CYLINDRICAL BATTERY

(71) Applicant: SANYO Electric Co., Ltd., Daito (JP)

(72) Inventors: Shin Haraguchi, Hyogo (JP); Oose Okutani, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 693 days.

(21) Appl. No.: 17/414,530

(22) PCT Filed: Dec. 2, 2019

(86) PCT No.: PCT/JP2019/047085
§ 371 (c)(1),
(2) Date: Jun. 16, 2021

(87) PCT Pub. No.: WO2020/137373
PCT Pub. Date: Jul. 2, 2020

(65) Prior Publication Data
US 2022/0052406 A1    Feb. 17, 2022

(30) Foreign Application Priority Data
Dec. 27, 2018   (JP) ................. 2018-244990

(51) Int. Cl.
*H01M 50/184*   (2021.01)
*H01M 10/0525*   (2010.01)
(Continued)

(52) U.S. Cl.
CPC ..... *H01M 50/107* (2021.01); *H01M 10/0525* (2013.01); *H01M 10/0587* (2013.01);
(Continued)

(58) Field of Classification Search
None
See application file for complete search history.

(56) References Cited

U.S. PATENT DOCUMENTS

| | | |
|---|---|---|
| 2017/0117526 A1 | 4/2017 | Lee et al. |
| 2018/0047973 A1* | 2/2018 | Kunoike ........... H01M 10/0587 |

FOREIGN PATENT DOCUMENTS

| | | |
|---|---|---|
| CN | 107431178 A | 12/2017 |
| JP | S53-042329 A | 4/1978 |

(Continued)

OTHER PUBLICATIONS

English Translation of International Search Report dated Feb. 18, 2020, issued in counterpart PCT/JP2019/047085. (3 pages).

(Continued)

*Primary Examiner* — Zhongqing Wei
(74) *Attorney, Agent, or Firm* — WHDA, LLP (57) ABSTRACT

The purpose of the present disclosure is to provide a cylindrical battery in which a short circuit between an outer can and a sealing body can be suppressed. In a cylindrical battery (10) according to an embodiment of the present disclosure, a gasket (28) includes an extension part (29) extending from between a sealing body (17) and a tip (33a) on a radially inward side of a shoulder (33) of an outer can (16). The extension part (29) is arranged so that the gasket (28) intersects any straight lines connecting an upper surface (47) of the shoulder (33) opposite to the electrode body side in the axial direction and an upper surface (41) of an inner portion (40) opposite to the electrode body side in the axial direction, the inner portion (40) being located radially inward of the shoulder (33) in the sealing body (17).

6 Claims, 6 Drawing Sheets

(51) Int. Cl.
*H01M 10/0587* (2010.01)
*H01M 50/107* (2021.01)
*H01M 50/147* (2021.01)
*H01M 50/186* (2021.01)

(52) U.S. Cl.
CPC ....... *H01M 50/147* (2021.01); *H01M 50/184* (2021.01); *H01M 50/186* (2021.01)

(56) References Cited

FOREIGN PATENT DOCUMENTS

| JP | S58-065759 U | 5/1983 |
| JP | S61-003665 U | 1/1986 |
| JP | S61-233964 A | 10/1986 |
| JP | H09-320562 A | 12/1997 |
| JP | 2010-067379 A | 3/2010 |
| WO | 2016/157749 A1 | 10/2016 |

OTHER PUBLICATIONS

Office Action dated Sep. 30, 2022, issued in counterpart CN application No. 201980085748.7, with English translation. (9 pages).
Extended (Supplementary) European Search Report dated Jan. 25, 2022, issued in counterpart EP application No. 19901775.7. (8 pages).

\* cited by examiner

CYLINDRICAL BATTERY

TECHNICAL FIELD

The present disclosure relates to a cylindrical battery.

BACKGROUND ART

Conventionally, there is a cylindrical battery described in PATENT LITERATURE 1 as a cylindrical battery. This cylindrical battery comprises an electrode assembly, an electrolyte solution, an exterior can, a gasket, and a sealing assembly. The exterior can has a bottomed cylindrical portion, and an annular shoulder portion bent radially inward from an end of the bottomed cylindrical portion on an opening side to extend inward. The electrode assembly and the electrolyte solution are housed in the bottomed cylindrical portion. The sealing assembly is caulked and fixed to the shoulder portion via the gasket. The exterior can acts as a negative electrode terminal, and a surface of the sealing assembly on a side opposite to a side of the electrode assembly in the axial direction acts as a positive electrode terminal.

CITATION LIST

Patent Literature

PATENT LITERATURE 1: Japanese Unexamined Patent Application Publication No. Hei 9-320562

SUMMARY

Technical Problem

When a plate-like conductor member such as a metal plate is accidentally dropped on the cylindrical battery at a factory or the like, there is a possibility that a short circuit occurs between the shoulder portion and the sealing assembly of the cylindrical battery, and such a short circuit is preferably suppressed. Additionally, such a short circuit between the exterior can and the sealing assembly is preferably suppressed even during transportation of the cylindrical battery.

Therefore, it is an advantage of the present disclosure to provide a cylindrical battery in which a short circuit between an exterior can and a sealing assembly can be suppressed.

Solution to Problem

In order to solve the aforementioned problem, a cylindrical battery according to the present disclosure comprises: an electrode assembly in which a positive electrode and a negative electrode are wound via a separator; an electrolyte; an exterior can having a bottomed cylindrical portion that houses the electrode assembly and the electrolyte, and an annular shoulder portion that is bent to an inward side in a radial direction from an end of the bottomed cylindrical portion on an opening side to extend to the inward side; and a sealing assembly caulked and fixed to the shoulder portion via a gasket, wherein the gasket includes an extending portion that extends from between a tip of the shoulder portion on the inward side in the radial direction and the sealing assembly, and the gasket intersects with all arbitrary straight lines connecting a first surface of the shoulder portion on a side opposite to a side of the electrode assembly in an axial direction and a second surface of the sealing assembly on a side opposite to a side of the electrode assembly in the axial direction.

Advantageous Effect of Invention

According to the cylindrical battery of the present disclosure, it is possible to suppress a short circuit between the exterior can and the sealing assembly.

DESCRIPTION OF EMBODIMENTS

Hereinafter, an embodiment of a cylindrical battery according to the present disclosure will be described in detail with reference to the drawings. The cylindrical battery of the present disclosure may be a primary battery, or may be a secondary battery. Additionally, the cylindrical battery may be a battery using an aqueous electrolyte, or may be a battery using a non-aqueous electrolyte. In the following, a non-aqueous electrolyte secondary battery (lithium ion battery) using a non-aqueous electrolyte will be exemplified as a cylindrical battery 10 of the embodiment. However, the cylindrical battery of the present disclosure is not limited to this.

In a case where a plurality of embodiments and modifications and the like are included in the following, it is assumed from the beginning that a new embodiment is constructed by appropriately combining those feature portions. In the following embodiments, the same components are denoted by the same reference numerals in the drawings, and duplicate descriptions are omitted. Schematic diagrams are included in a plurality of the drawings, and the dimensional ratios such as lengths, widths and heights of each member between different drawings are not necessarily the same. In this specification, for convenience of explanation, the direction along the axial direction of a battery case 15 is defined as the height direction, the sealing assembly 17 side in the height direction is "up", and the bottom side of an exterior can 16 in the height direction is defined as "bottom". Of the components described below, components that are not described in the independent claim indicating the highest level concept are arbitrary components, and are not essential components.

Figure 1:
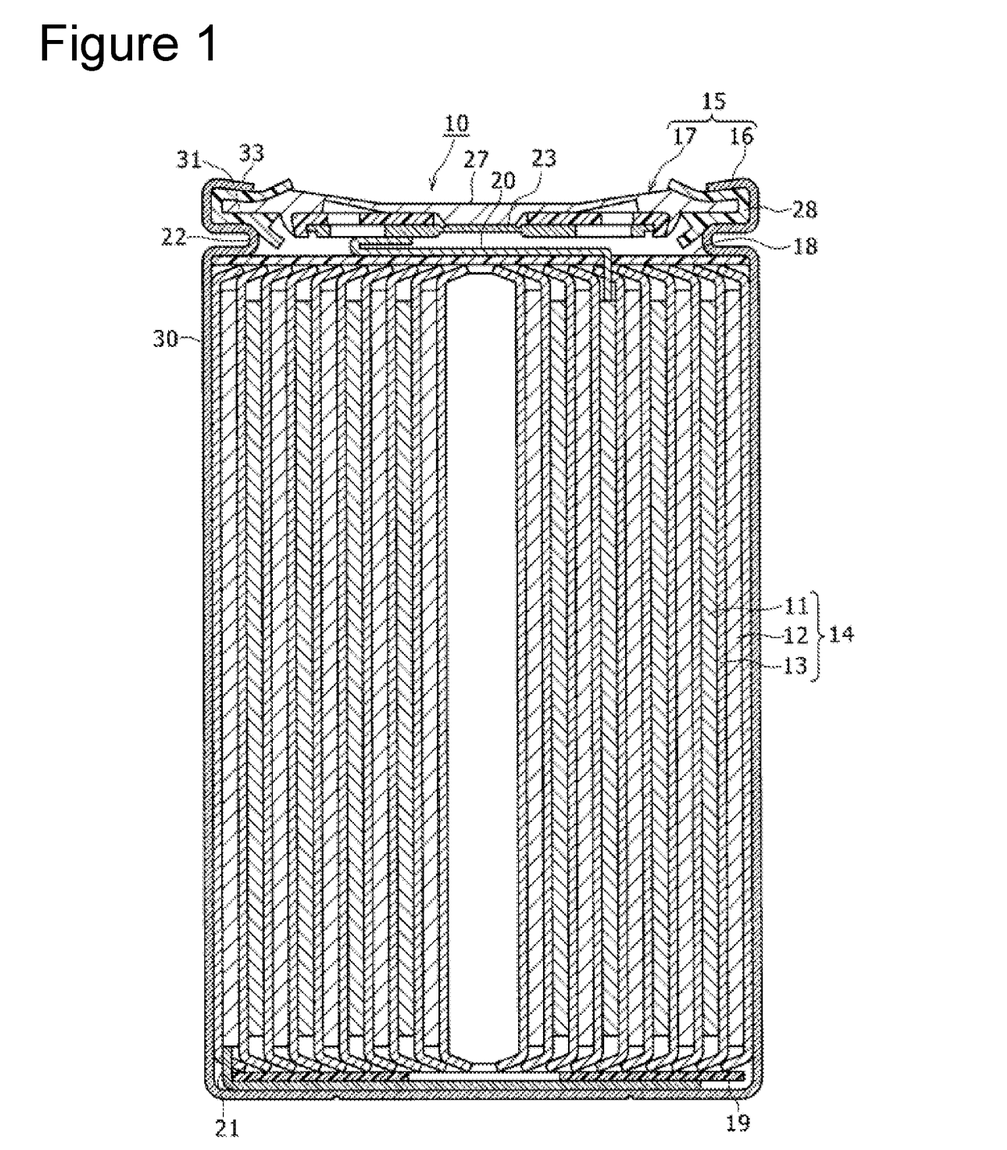
FIG. 1 is an axial sectional view of a cylindrical battery according to an embodiment of the present disclosure.
Figure 2:
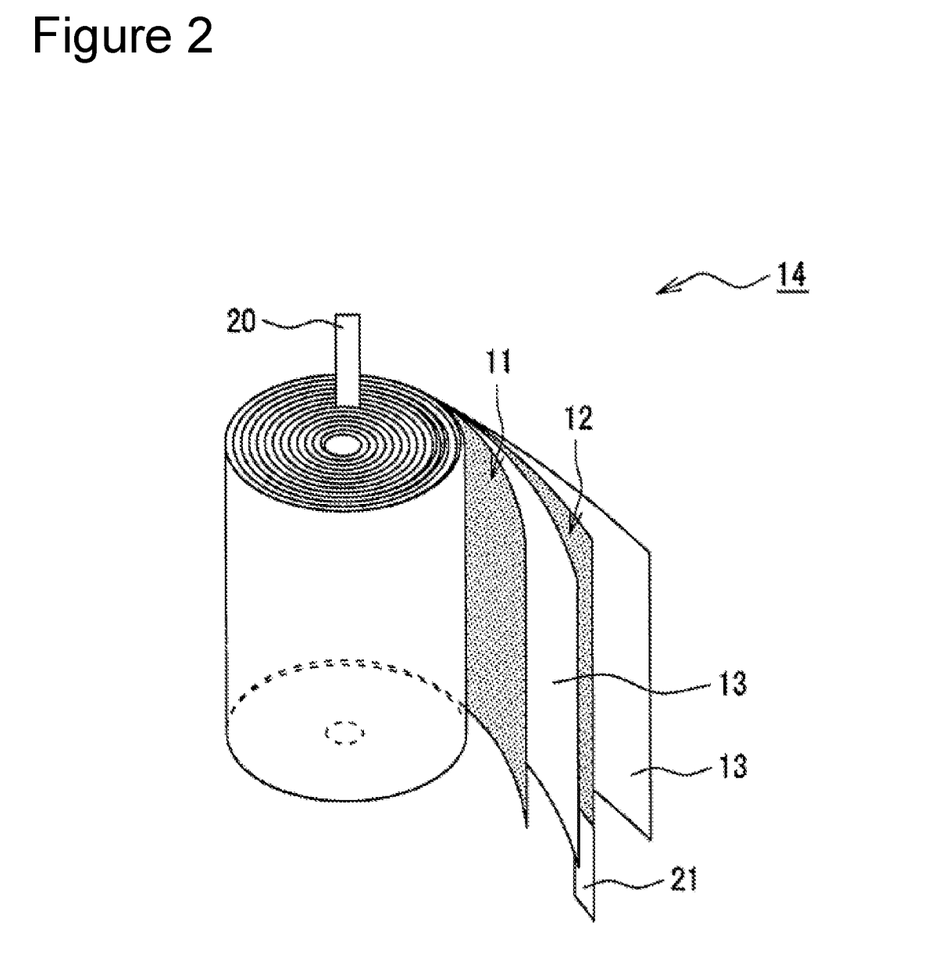
FIG. 2 is a perspective view of an electrode assembly of the cylindrical battery.

FIG. 1 is an axial sectional view of the cylindrical battery 10 according to the embodiment of the present disclosure, and FIG. 2 is a perspective view of an electrode assembly 14 of the cylindrical battery 10. As illustrated in FIG. 1, the cylindrical battery 10 comprises the wound-type electrode assembly 14, a non-aqueous electrolyte (not illustrated), and the battery case 15 that houses the electrode assembly 14 and the non-aqueous electrolyte. As illustrated in FIG. 2, the electrode assembly 14 includes a positive electrode 11, a negative electrode 12, and a separator 13 interposed between the positive electrode 11 and the negative electrode 12, and has a wound structure in which the positive electrode 11 and the negative electrode 12 are wound via the separator 13. Referring to FIG. 1 again, the battery case 15 is composed of the bottomed cylindrical exterior can 16 and the sealing assembly 17 that blocks an opening of the exterior can 16. The cylindrical battery 10 comprises a resin gasket 28 disposed between the exterior can 16 and the sealing assembly 17.

The non-aqueous electrolyte includes a non-aqueous solvent and an electrolyte salt dissolved in the non-aqueous solvent. For a non-aqueous solvent, for example, esters, ethers, nitriles, amides, and two or more groups of mixed solvents thereof, or the like may be used. The non-aqueous solvent may contain a halogen substitution compound obtained by substituting at least a part of hydrogen of these solvents with a halogen atom such as fluorine. The non-aqueous electrolyte is not limited to a liquid electrolyte, but may be a solid electrolyte using gelatinous polymer, or the like. As the electrolyte salt, a lithium salt such as $LiPF_6$ is used.

As illustrated in FIG. 2, the electrode assembly 14 has the long positive electrode 11, the long negative electrode 12, and the two long separators 13. The electrode assembly 14 has a positive electrode lead 20 joined to the positive electrode 11 and a negative electrode lead 21 joined to the negative electrode 12. The negative electrode 12 is formed to be one size larger than the positive electrode 11 in order to suppress precipitation of lithium, and is longer in the longitudinal direction and the width direction (short direction) than the positive electrode 11. The two separators 13 are each formed to be at least one size larger than the positive electrode 11, and are each disposed so as to interpose, for example, the positive electrode 11 therebetween.

The positive electrode 11 has a positive electrode current collector and a positive electrode mixture layer formed on both surfaces of the current collector. As the positive electrode current collector, it is possible to use foil of a metal stable in a potential range of the positive electrode 11, such as aluminum and an aluminum alloy, a film including such a metal disposed on a surface layer thereof, or the like. The positive electrode mixture layer includes a positive electrode active material, a conductive agent, and a binder. The positive electrode 11 can be produced by, for example, applying a positive electrode mixture slurry including a positive electrode active material, a conductive agent, a binder, and the like on a positive electrode current collector, drying the applied film, and thereafter compressing and forming a positive electrode mixture layer on both surfaces of the current collector.

The positive electrode active material is composed of a lithium-containing metal composite oxide as a main component. Examples of metal elements contained in the lithium-containing metal composite oxide include Ni, Co, Mn, Al, B, Mg, Ti, V, Cr, Fe, Cu, Zn, Ga, Sr, Zr, Nb, In, Sn, Ta, W and the like. An example of the lithium-containing metal composite oxide is preferably a composite oxide containing at least one of the group consisting of Ni, Co, Mn and Al.

Examples of conductive agents included in the positive electrode mixture layer include carbon powders such as carbon black, acetylene black, Ketjen black, and graphite. As the binder included in the positive electrode mixture layer, fluororesin such as polytetrafluoroethylene (PTFE) and polyvinylidene fluoride (PVdF), and polyacrylonitrile (PAN), polyimide, acrylic resin, polyolefin, and the like can be exemplified. These resins may be used in combination with cellulose derivatives such as carboxymethyl cellulose (CMC) or salts thereof, polyethylene oxide (PEO), or the like.

The negative electrode 12 has a negative electrode current collector, and a negative electrode mixture layer formed on both surfaces of the current collector. As the negative electrode current collector, it is possible to use foil of a metal stable in a potential range of the negative electrode 12, such as copper and a copper alloy, a film including such a metal disposed on a surface layer thereof, or the like. The negative electrode mixture layer includes a negative electrode active material, and a binder. The negative electrode 12 can be produced by, for example, applying a negative electrode mixture slurry including a negative electrode active material, a binder, and the like on a negative electrode current collector, drying the applied film, and thereafter compressing and forming a negative electrode mixture layer on both surfaces of the current collector.

As the negative electrode active material, a carbon material that reversibly occludes and releases lithium ions is generally used. A preferable carbon material is graphite such as natural graphite such as flaky graphite, lump graphite and earthy graphite, and artificial graphite such as lump artificial graphite and graphited mesophase carbon microbeads. The negative electrode mixture layer may include a Si-containing compound as the negative electrode active material. As the negative electrode active material, a metal alloyed with lithium other than Si, an alloy containing such a metal, a compound containing such a metal, and the like may be used.

As the binder included in the negative electrode mixture layer, fluororesin, PAN, polyimide resin, acrylic resin, polyolefin resin, or the like may be used like the case of the positive electrode 11, and a styrene-butadiene rubber (SBR) or a modification thereof is preferably used. As the negative electrode mixture layer, for example, in addition to SBR and the like, CMC or the salts thereof, poly acrylic acid (PAA) or the salts thereof, polyvinyl alcohol, or the like may be included.

As each separator 13, a porous sheet having ion permeability and insulation is used. Specific examples of the porous sheet include microporous thin films, woven fabric, and non-woven fabric. As a material for the separator 13, olefin resins such as polyethylene and polypropylene, cellulose, or the like is preferable. The separator 13 may be either a single layer structure or a laminated structure. A heat-resistant layer or the like may be formed on a surface of the separator 13. The negative electrode 12 may compose a winding start end of the electrode assembly 14, but the separator 13 generally extends beyond a winding start side end of the negative electrode 12, and a winding start side end of the separator 13 becomes a winding start end of the electrode assembly 14.

In the example illustrated in FIG. 1 and FIG. 2, the positive electrode lead 20 is electrically connected to an intermediate portion such as a central portion in the winding direction of a positive electrode current collector, and the negative electrode lead 21 is electrically connected to a winding finish end in the winding direction of a negative electrode current collector. However, the negative electrode lead may be electrically connected to a winding start end in the winding direction of the negative electrode current collector. Alternatively, the electrode assembly has two negative electrode leads, one of the negative electrode lead is electrically connected to the winding start end in the winding direction of the negative electrode current collector, and the other negative electrode lead may be electrically connected to a winding finish end in the winding direction of the negative electrode current collector. Alternatively, an end on the winding finish side in the winding direction of the negative electrode current collector is brought into contact with an inner surface of the exterior can, so that the negative electrode and the exterior can may be electrically connected.

As illustrated in FIG. 1, the cylindrical battery 10 has an insulating plate 18 disposed on the upper side of the electrode assembly 14, and an insulating plate 19 disposed on the lower side of the electrode assembly 14. In the example illustrated in FIG. 1, the positive electrode lead 20 attached to the positive electrode 11 extends toward the sealing assembly 17 through a through hole of the insulating plate 18, and the negative electrode lead 21 attached to the negative electrode 12 passes through the outside of the insulating plate 19 to extend toward a bottom of the exterior can 16. The positive electrode lead 20 is connected to a lower surface of the terminal plate 23, which is a bottom plate of the sealing assembly 17, by means of welding or the like, and the vent member 27, which is a top plate of the sealing assembly 17 electrically connected to the terminal plate 23, serves as the positive electrode terminal. The negative electrode lead 21 is connected to an inner surface of the bottom of the exterior can 16 by means of welding or the like, and the exterior can 16 serves as the negative electrode terminal.

The exterior can 16 is a metal container having a bottomed cylindrical portion. A portion between the exterior can 16 and the sealing assembly 17 is sealed by the annular gasket 28, and an internal space of the battery case 15 is closed. The gasket 28 has a role of a seal material for maintaining the airtightness of the inside of the battery, and has a role of preventing leakage of an electrolytic solution. In addition, the gasket 28 has a role as an insulating material to prevent a short circuit between the exterior can 16 and the sealing assembly 17. The exterior can 16 has, for example, a grooving portion 22 formed by spinning a side surface portion from the outside. The grooving portion 22 is preferably formed in an annular shape along the circumferential direction of the exterior can 16, and the sealing assembly 17 is supported on an upper surface of the grooving portion 22. The exterior can 16 has a bottomed cylindrical portion 30 that houses the electrode assembly 14 and the non-aqueous electrolyte, and an annular shoulder portion 33, and the shoulder portion 33 is bent to the inward side in the radial direction from an end of the bottomed cylindrical portion 30 on the opening side to extend to the inward side. The shoulder portion 33 is formed when an upper end of the exterior can 16 is bent to the inside and caulked to a circumferential edge 31 of the sealing assembly 17.

Figure 3:
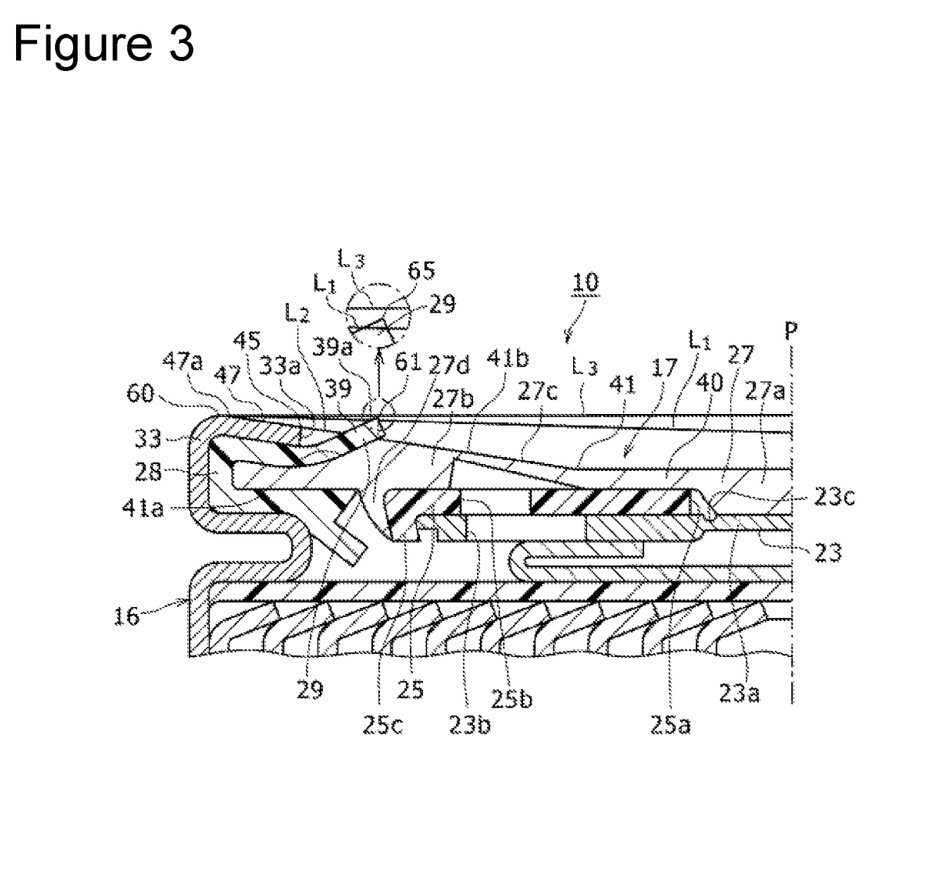
FIG. 3 is an enlarged sectional view of a part located on one side of a central axis in a sealing assembly peripheral portion of the cylindrical battery.

Now, the sealing assembly 17 will be described. FIG. 3 is an enlarged sectional view of a part located on one side of a central axis in a sealing assembly peripheral portion of the cylindrical battery 10. As illustrated in FIG. 3, the sealing assembly 17 has a structure in which the terminal plate 23, an annular insulating plate 25, and the vent member 27 are laminated in this order from the electrode assembly 14 side. The vent member 27 has a circular shape in plan view. The vent member 27 can be produced by, for example, pressing a plate material of aluminum or an aluminum alloy. The aluminum and the aluminum alloy are excellent in flexibility, and therefore are preferably as a material of the vent member 27.

The vent member 27 has a circular shape in plan view, and a thin wall portion 27c is formed in an intermediate portion connecting a central portion 27a and an outer circumferential portion 27b. When battery internal pressure rises, the thin wall portion 27c reverses and breaks, so that the vent member 27 functions as an explosion-proof valve. The central portion 27a is formed so as to project toward the terminal plate 23, so that connection between the vent member 27 and the terminal plate 23 is facilitated.

The insulating plate 25 is formed in an annular shape in plan view, and has a through hole 25a in the center. The insulating plate 25 is fitted and fixed to a projection 27d formed so as to project downward in the outer circumferential portion 27b of the vent member 27. The insulating plate 25 is provided so as to ensure an insulation property, and is preferably composed of a material that does not affect a battery characteristic. As the material of the insulating plate 25, polymer resin is included, and polypropylene (PP) resin and polybutylene terephthalate (PBT) resin can be exemplified. The insulating plate 25 has a vent hole 25b penetrating the insulating plate in the height direction on the outer circumferential side. The insulating plate 25 has an annular skirt portion 25c extending downward on an outer circumferential edge.

The terminal plate 23 has a circular outer shape with a diameter smaller than that of the insulating plate 25 in plan view, and a central portion 23a is a thin portion. The terminal plate 23 is disposes so as to face the vent member 27 with the insulating plate 25 interposed between the terminal plate 23 and the vent member 27. The terminal plate 23 is attached to the insulating plate 25 by fitting an outer circumferential surface of the terminal plate 23 into an inner circumferential surface of the skirt portion 25c of the insulating plate 25 and fixing the terminal plate 23. The center of the vent member 27 and the center of the terminal plate 23 are connected to each other through the through hole 25a of the insulating plate 25.

The terminal plate 23 is preferably formed from aluminum or an aluminum alloy like the vent member 27, so that the connection between the central portion of the vent member 27 and the central portion of the terminal plate 23 can be easily performed. As the connecting method, metallurgical joint is preferably used, and laser welding is exemplified as the metallurgical joint. A vent hole 23b that penetrates the terminal plate 23 in the height direction is formed on the outer circumferential side of the terminal plate 23. The vent hole 23b communicates with the vent hole 25b of the insulating plate 25. As illustrated in FIG. 3, the inner circumferential surface of the skirt portion 25c may have a conical trapezoidal shape having an inner diameter that decreases toward the lower side. Alternatively, the outer circumferential surface of the terminal plate 23 may have a conical trapezoidal shape corresponding to the inner circumferential surface thereof. In such a case, the terminal plate 23 is press-fitted and fixed to the skirt portion 25c, so that it is possible to reliably prevent positional shift of the terminal plate 23 to the vent member 27.

Now, the structure (shape) of the gasket 28, and the positional relationship of the gasket 28 with respect to the shoulder portion 33 of the exterior can 16 and the sealing assembly 17 will be described. As illustrated in FIG. 3, the gasket 28 has the annular extending portion 29 extending from between an inward tip 33a of the shoulder portion 33 of the exterior can 16, and the sealing assembly 17. An upper surface 41 of the sealing assembly 17 includes an annular first inclined surface portion 41a that goes upward (side opposite to the electrode assembly 14 in the height direction) while extending radially inward at an inward portion 40 located on the radially inward side with respect to the shoulder portion 33. The extending portion 29 has a covering portion 39 that covers the first inclined surface portion 41a. The covering portion 39 extends along the first inclined surface portion 41a, and the extending portion 29 is bent upward by vertical force from the first inclined surface portion 41a.

The upper surface 41 of the sealing assembly 17 further includes a second inclined surface portion 41b. The second inclined surface portion 41b is connected to an inward end of the first inclined surface portion 41a, and inclines so as to go downward toward the radially inside. An upper surface 47 of the shoulder portion 33 (outer surface of the shoulder portion 33 on a side opposite to the electrode assembly 14 in the height direction) is located on the upper side with respect to the sealing assembly 17. The upper surface 47 of the shoulder portion 33 includes a third inclined surface portion 47a, and the third inclined surface portion 47a inclines so as to go downward toward the radially inside. In the embodiment, in the sectional view illustrated in FIG. 3, the second inclined surface portion 41b and the third inclined surface portion 47a are located on substantially the same straight line.

The gasket 28 intersects with all arbitrary straight lines connecting the upper surface 47 of the shoulder portion 33 and the upper surface 41 of the sealing assembly 17. For example, the arbitrary straight lines include a straight line $L_1$ connecting a shoulder portion upper end 60 on the uppermost side of the upper surface 47 of the shoulder portion 33, and a sealing assembly upper end (not illustrated) farthest from the shoulder portion upper end 60 in a portion located on the uppermost side of the upper surface 41 of the sealing assembly 17, in the cross section illustrated in FIG. 3. Herein, the sealing assembly upper end is a point line-symmetrical to an intersection 61 of the first inclined surface portion 41a and the second inclined surface portion 41b with respect to the central axis P in the cross section illustrated in FIG. 3. The upper surface 47 of the shoulder portion 33 composes a first surface, and the upper surface 41 of the sealing assembly 17 composes a second surface.

For example, the above arbitrary straight lines also include a straight line $L_2$ including the second inclined surface portion 41b and the third inclined surface portion 47a, in the cross section illustrated in FIG. 3. In FIG. 3, a straight line $L_3$ is a straight line that is orthogonal to the height direction and passes through the shoulder portion upper end (point located on the uppermost side of the exterior can 16) 60. As illustrated in a partial enlarged view illustrated by a circle of a dashed line in FIG. 3, an extending portion upper end (upper end of the gasket 28) 65 located on the uppermost side of the extending portion 29 is located on the lower side in the height direction (electrode assembly 14 side in the height direction) with respect to the straight line $L_3$, and the extending portion upper end 65 is located on the lower side with respect to the shoulder portion upper end 60. The extending portion upper end 65 composes a first place, and the shoulder portion upper end 60 composes a second place.

As described above, according to the cylindrical battery 10 of the present disclosure, the gasket 28 includes the extending portion 29 extending from between the inward tip 33a of the shoulder portion 33 and the sealing assembly 17, and the upper surface 47 of the shoulder portion 33, and the gasket 28 intersects with the all arbitrary straight lines connecting the upper surface 47 of the shoulder portion 33 and the upper surface of the inward portion. Therefore, a flat plate-like conductive plate cannot be located across the upper surface 47 of the shoulder portion 33 and the upper surface 41 of the sealing assembly 17. Accordingly, it is possible to significantly suppress the short circuit between the shoulder portion 33 and the sealing assembly 17 caused by the flat plate-like conductive plate.

Figure 4:
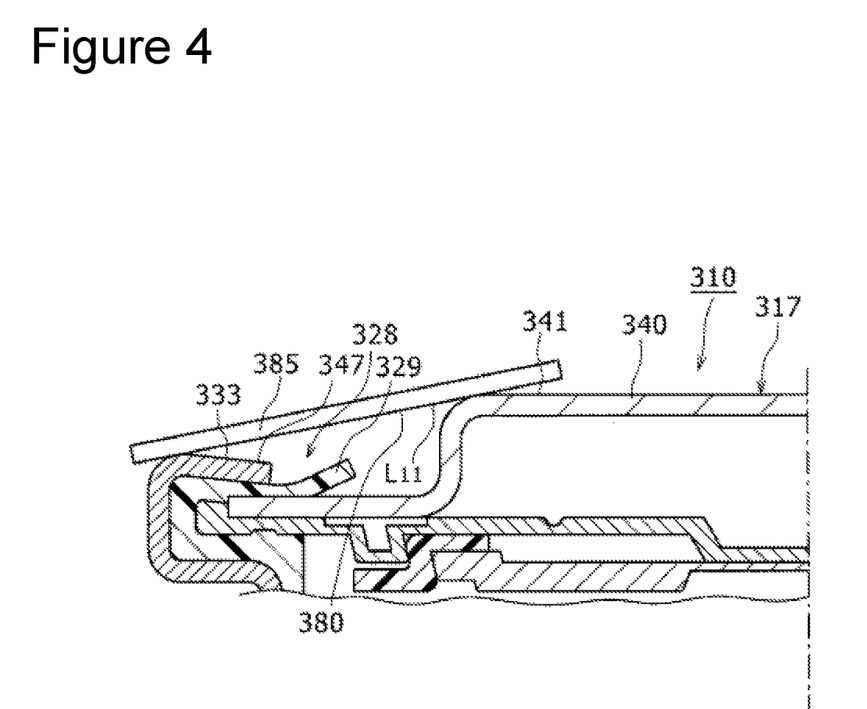
FIG. 4 is an enlarged sectional view of a cylindrical battery of a reference example corresponding to FIG. 3.

Specifically, as illustrated in FIG. 4, that is, an enlarged sectional view corresponding to FIG. 3, of a cylindrical battery 310 of a reference example, in a case where an arbitrary straight line connecting an upper surface 341 of an inward portion 340 located on the radially inward side with respect to a shoulder portion 333 in a sealing assembly 317, and an upper surface 347 of the shoulder portion 333 includes a straight line $L_{11}$ that does not intersects with an extending portion 329 of a gasket 328, a conductive plate (metal plate) 385 having a lower surface 380 including the straight line $L_{11}$ can be located across the upper surface 347 of the shoulder portion 333 and the upper surface 341 of the sealing assembly 317, and a short circuit between the shoulder portion 347 and the sealing assembly 317 easily occurs through the conductive plate (metal plate) 385. On the other hand, like the cylindrical battery 10 of the present disclosure illustrated in FIG. 3, in a case where the gasket 28 intersects with all arbitrary straight lines connecting the upper surface 41 of the sealing assembly 17 and the upper surface 47 of the shoulder portion 33, the location of the conductive plate as illustrated in FIG. 4 is impossible by the extending portion 329. Accordingly, it is possible to significantly suppress the short circuit between the exterior can 16 and the sealing assembly 17 due to the conductive member that exists outside the battery.

The first inclined surface portion 41a that goes in a direction opposite to the electrode assembly 14 in the height direction (axial direction) as the upper surface 41 of the inward portion 40 goes toward the radially inner side may be included, and the gasket 28 may have the covering portion 39 that is in contact with at least a part of the first inclined surface portion 41a and covers at least the part of the first inclined surface portion 41a.

According to the aforementioned configuration, the extending portion 29 of the gasket 28 can be deformed diagonally upward by force from the first inclined surface portion 41a, and can extend diagonally upward along the first inclined surface portion 41a. Therefore, the length in the height direction of the extending portion 29 can be easily increased, and the position of the extending portion 29 can be precisely positioned. Accordingly, it is possible to easily realize a configuration in which the extending portion 29 intersects with the aforementioned all arbitrary straight lines.

The sealing assembly 17 may be located closer to the electrode assembly 14 in the axial direction than the upper surface 47 of the shoulder portion 33. The upper surface 41 of the inward portion 40 may include the annular second inclined surface portion 41b that goes toward the electrode assembly 14 in the height direction toward the radially inner side, on the radially inward side with respect to the first inclined surface portion 41a.

According to the aforementioned configuration, the upper surface 41 of the inward portion 40 of the sealing assembly 17 is easily disposed on the side of the electrode assembly 14 in the height direction. Therefore, even when the extending portion 29 is not much projected in the height direction, the configuration in which the gasket 28 intersects with the all arbitrary straight lines is easily realized. Accordingly, the cylindrical battery 10 is easily configured to be compact.

The extending portion upper end 65 of the gasket 28 located farthest from the electrode assembly 14 in the height direction is preferably located closer to the electrode assembly 14 in the height direction than the shoulder portion upper end 60 of the shoulder portion 33 located farthest from the electrode assembly 14 in the height direction.

According to the aforementioned configuration, the shoulder portion upper end 60 located on the uppermost side of the shoulder portion 33 is located on the upper side with respect to the extending portion upper end 65 located on the uppermost side of the gasket 28. Consequently, the volume of the electrode assembly 14 to be housed in the cylindrical battery 10 is increased, and therefore the cylindrical battery 10 having high volume energy density is easily realized.

The present disclosure is not limited to the aforementioned embodiment and the modification thereof, and various improvements and changes can be made within the scope of the claims of the present application and the equivalent scope thereof.

Figure 5:
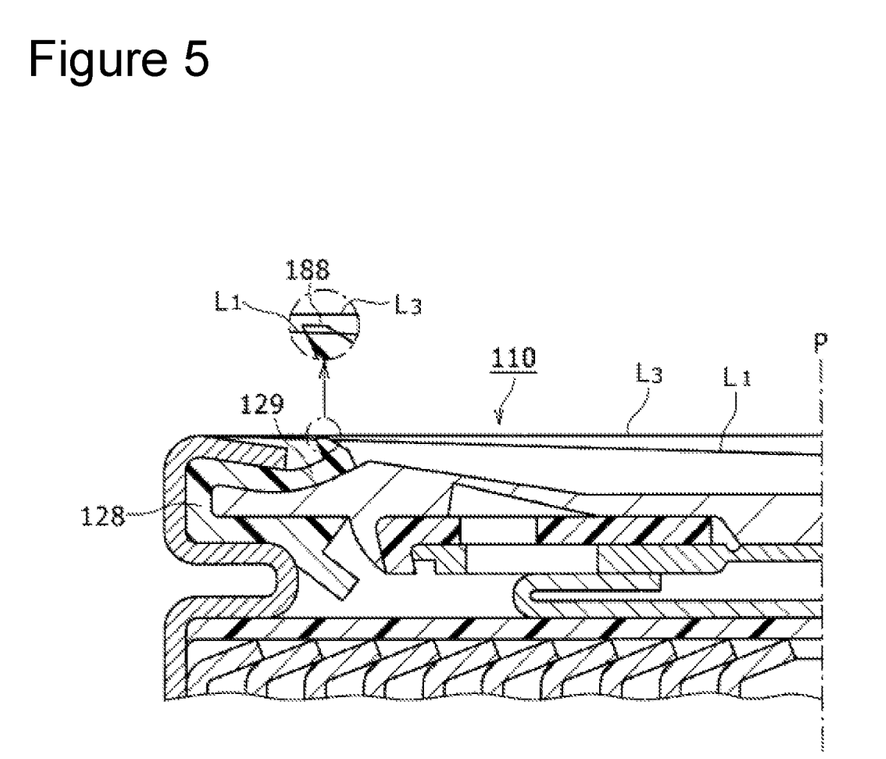
FIG. 5 is an enlarged sectional view of a cylindrical battery of a modification corresponding to FIG. 3.

For example, in the above embodiment, as illustrated in FIG. 3, the upper surface of the extending portion 29 of the gasket 28 goes upward in the height direction toward the radially inner side. However, as illustrated in FIG. 5, that is, the enlarged sectional view corresponding to FIG. 3, of a cylindrical battery 110 of a modification, the shape of a gasket 128 before battery built-in is devised, so that a tip side 188 of an extending portion 129 of the gasket 128 may be projected radially outward toward the upper side in the height direction. According to this modification, the volume of the gasket 128 is easily reduced, and a material cost of the gasket 128 is easily reduced. The definition of a straight line $L_1$ and a straight line $L_3$ illustrated in FIG. 5 is the same as the definition of the straight line $L_1$ and the straight line $L_3$ illustrated in FIG. 3.

In the above embodiment, a case where the upper surface 41 of the inward portion 40 includes the annular first inclined surface portion 41a that goes downward in the height direction toward the radially inner side is described. However, the upper surface of the inward portion may include a non-annular first inclined surface portion that goes downward toward the radially inner side. Furthermore, the upper surface of the inward portion of the sealing assembly may not have an inclined surface.

Figure 6:
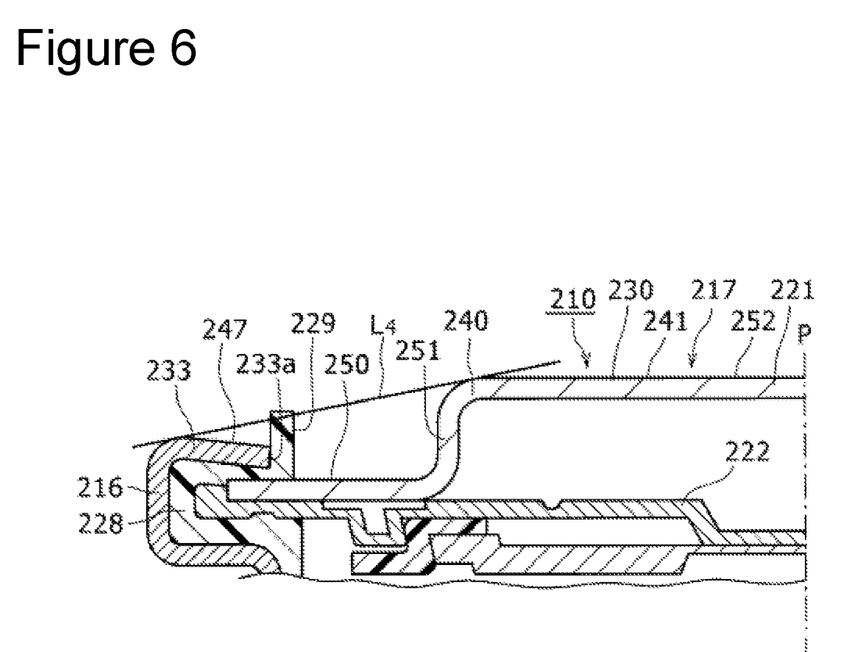
FIG. 6 is an enlarged sectional view of a cylindrical battery of another modification corresponding to FIG. 3.

Specifically, as illustrated in FIG. 6, that is, the enlarged sectional view corresponding to FIG. 3, of a cylindrical battery 210 of another modification, a sealing assembly 217 may comprise a cap 221 disposed on a vent member 222, and the cap 221 may have a bulge 230 that bulges in the height direction at a radially central portion. More specifically, the cap 221 may have an annular portion 250, a cylindrical portion 251 and a disk portion 252. Each of the annular portion 250 and the disk portion 252 is substantially located on a plane orthogonal to the height direction, and the cylindrical portion 251 may extend in the height direction. The cylindrical portion 251 may connect a radially inward edge of the annular portion 250 and an outer circumferential edge of the disk portion 252.

The cylindrical battery 210 may include an annular gasket 228 between an exterior can 216 and the sealing assembly 217, and the gasket 228 may include an extending portion 229 extending from between a radially inward tip 233a in a shoulder portion 233 and the sealing assembly 217. The extending portion 229 extends upward in the height direction, so that the extending portion 229 may intersect with all arbitrary straight lines connecting an upper surface 247 of the shoulder portion 233, and an upper surface 241 of the sealing assembly 217. The bulge 230 of the cap 221 may be located on the upper side with respect to the upper surface 247 of the shoulder portion 233. A straight line $L_4$ illustrated in FIG. 6 is a straight line tangent to both the upper surface 247 of the shoulder portion 233 and the upper surface 241 of the cap 221, and is a straight line included in the above arbitrary straight lines.

The case where the extending portion upper end 65 of the gasket 28 located farthest from the electrode assembly 14 in the height direction is located closer to the electrode assembly 14 in the height direction than the shoulder portion upper end 60 of the shoulder portion 33 located farthest from the electrode assembly 14 in the height direction is described. However, the first place of the gasket located farthest from the electrode assembly in the height direction (axial direction) may be located on the upper side in the height direction with respect to the second place of the shoulder portion located farthest from the electrode assembly in the height direction.

REFERENCE SIGNS LIST 10, 110, 210 cylindrical battery, 11 positive electrode, 12 negative electrode, 13 separator, 14 electrode assembly, 16, 216 exterior can, 17, 217 sealing assembly, 28, 128, 228 gasket, 29, 129, 229 extending portion, 30 bottomed cylindrical portion, 33, 233 shoulder portion, 33a, 233a radially inward tip of shoulder portion, 39 covering portion, 41, 241 upper surface of inward portion (second surface), 41a first inclined surface portion, 41b second inclined surface portion, 47, 247 upper surface of shoulder portion (first surface), 60 shoulder portion upper end (second place), 65 extending portion upper end (first place)

The invention claimed is:

1. A cylindrical battery comprising:
an electrode assembly in which a positive electrode and a negative electrode are wound via a separator;
an electrolyte;
an exterior can having an opening at one end thereof in an axial direction, the exterior can including:
a bottomed cylindrical portion that houses the electrode assembly and the electrolyte, and
an annular shoulder portion that is bent directly from an end of the bottomed cylindrical portion on an opening side, such that the annular shoulder portion extends from the end of the bottomed cylindrical portion to a tip of the annular shoulder portion facing the opening of the exterior can in a radial direction; and
a sealing assembly caulked and fixed to the annular shoulder portion via a gasket, wherein
the gasket includes an extending portion that extends from between the tip of the shoulder portion and the sealing assembly, and
the gasket intersects with all straight lines connecting a first surface and a second surface,
the first surface represents an entire surface of the annular shoulder portion which faces away from the electrode assembly in the axial direction, and is defined between the end of the bottomed cylindrical portion and the tip of the annular shoulder portion in the radial direction, and
the second surface represents an entire surface of the sealing assembly which faces away from the electrode assembly in the axial direction, and is defined by an outermost circumference of the sealing assembly in the radial direction.

2. The cylindrical battery according to claim 1, wherein
the second surface includes a first inclined surface portion that extends inward in the radial direction with an increasing distance from the electrode assembly in the axial direction, and
the extending portion is bent so as to conform to the first inclined surface portion.

3. The cylindrical battery according to claim 2, wherein the first inclined surface portion is an annular inclined surface portion.

4. The cylindrical battery according to claim 2, wherein
in the axial direction, a distance between the sealing assembly and the electrode assembly is shorter than a distance between the first surface and the electrode assembly, and
the second surface includes an annular second inclined surface portion that extends inward in the radial direction with a decreasing distance from the electrode assembly in the axial direction,
wherein the annular second inclined surface portion is located inward from the first inclined surface portion in the radial direction.

5. The cylindrical battery according to claim 1, wherein
in the axial direction, a farthest point of the gasket from the electrode assembly is closer to the electrode assembly than a farthest point of the annular shoulder portion from the electrode assembly.

6. A cylindrical battery comprising:
an electrode assembly in which a positive electrode and a negative electrode are wound via a separator;
an electrolyte;
an exterior can having an opening at one end thereof in an axial direction, the exterior can including:
   a bottomed cylindrical portion that houses the electrode assembly and the electrolyte, and
   an annular shoulder portion that is bent directly from an end of the bottomed cylindrical portion on an opening side, such that the annular shoulder portion extends from the end of the bottomed cylindrical portion to a tip of the annular shoulder portion facing the opening of the exterior can in a radial direction; and
a sealing assembly caulked and fixed to the annular shoulder portion via a gasket, wherein
the gasket includes an extending portion that extends from between the tip of the shoulder portion and the sealing assembly, and
the gasket intersects with a straight line connecting a first point and a second point,
the first point being a farthest point of the annular shoulder portion from the electrode assembly in the axial direction, and
the second point being any point on an entire surface of the sealing assembly which faces away from the electrode assembly in the axial direction.

* * * * *